June 25, 1957 W. A. BLACK 2,796,729
SECONDARY CLOCK SETTING MECHANISM
Filed Dec. 24, 1953 7 Sheets-Sheet 1

INVENTOR
William A. Black
ATTORNEY

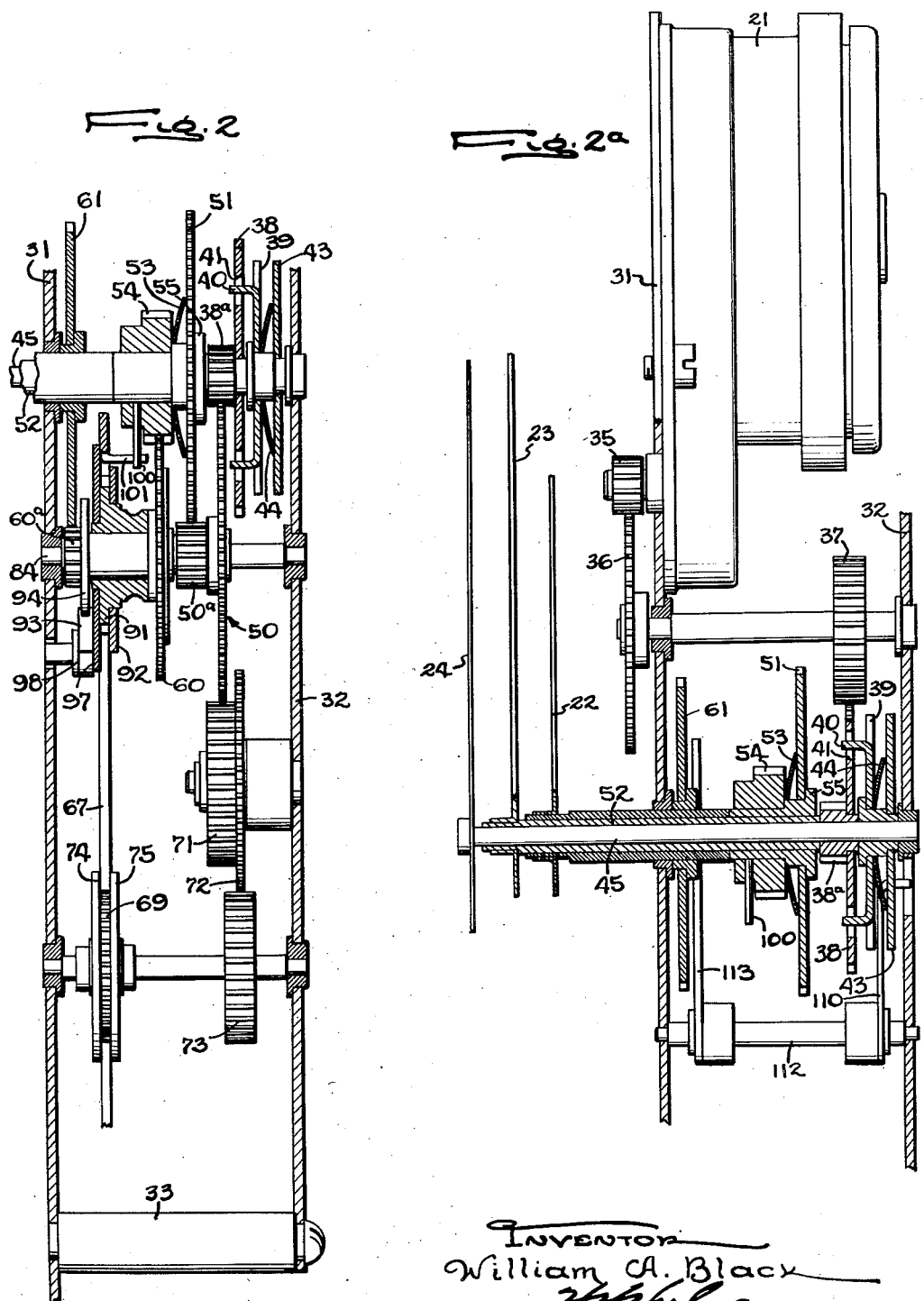

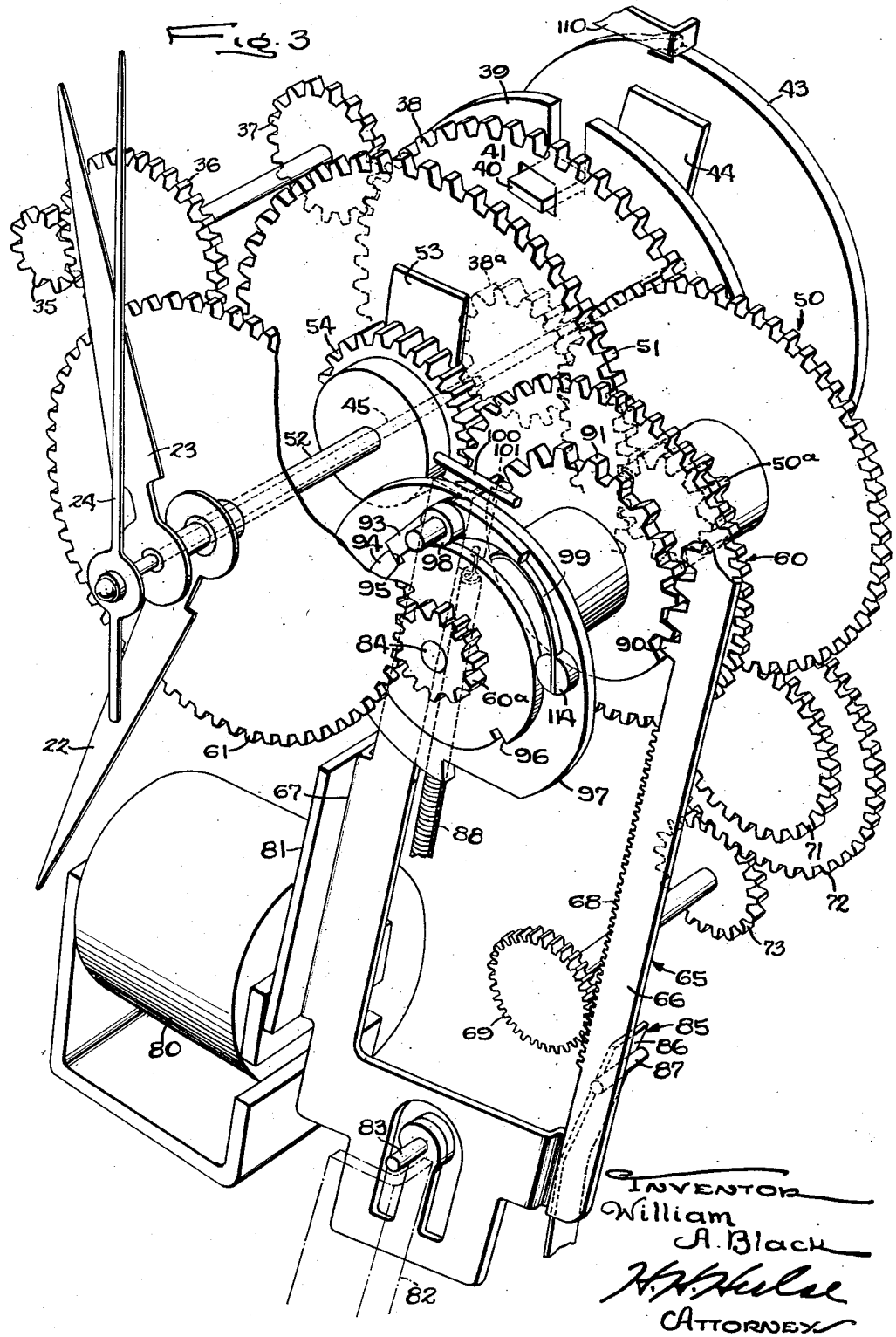

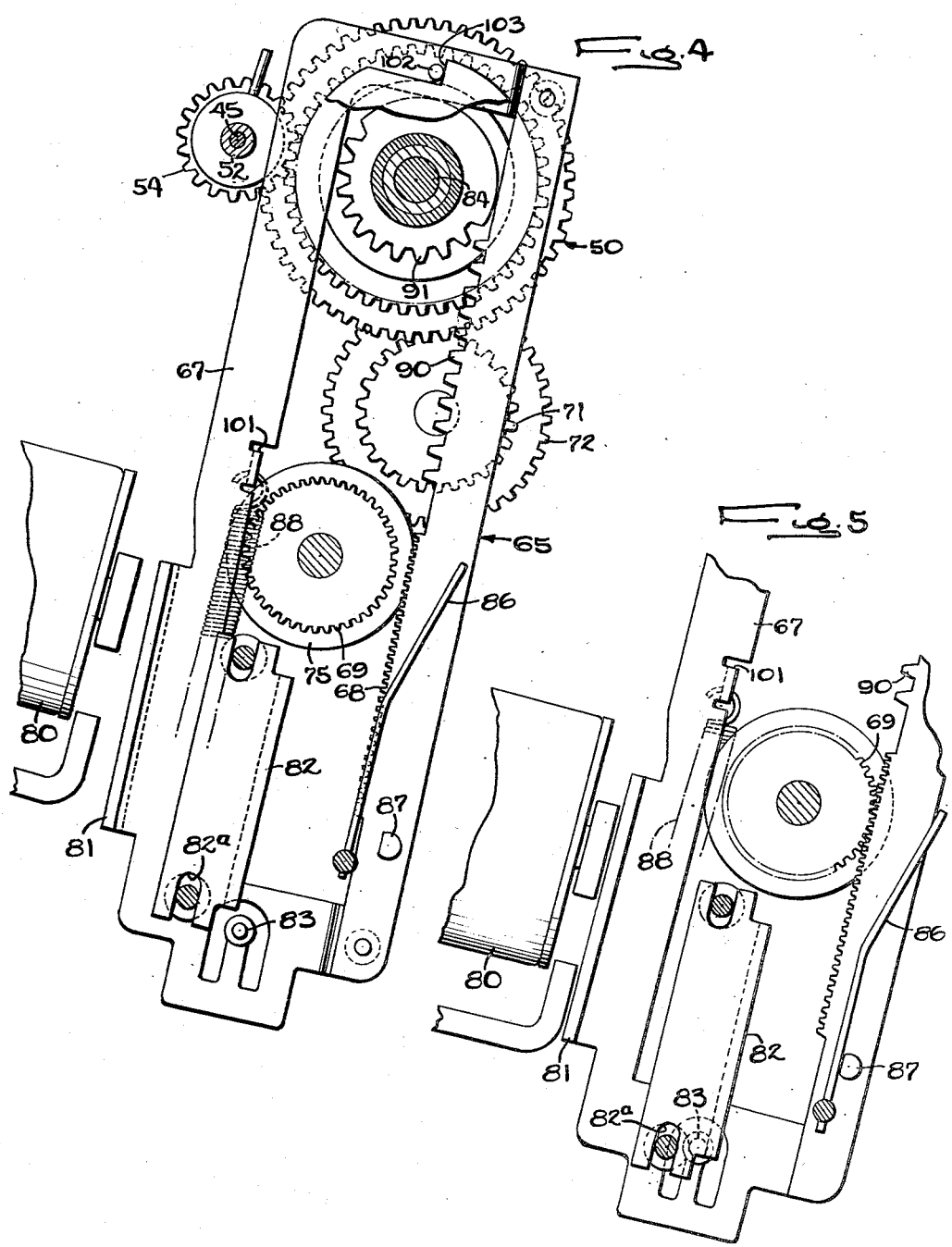

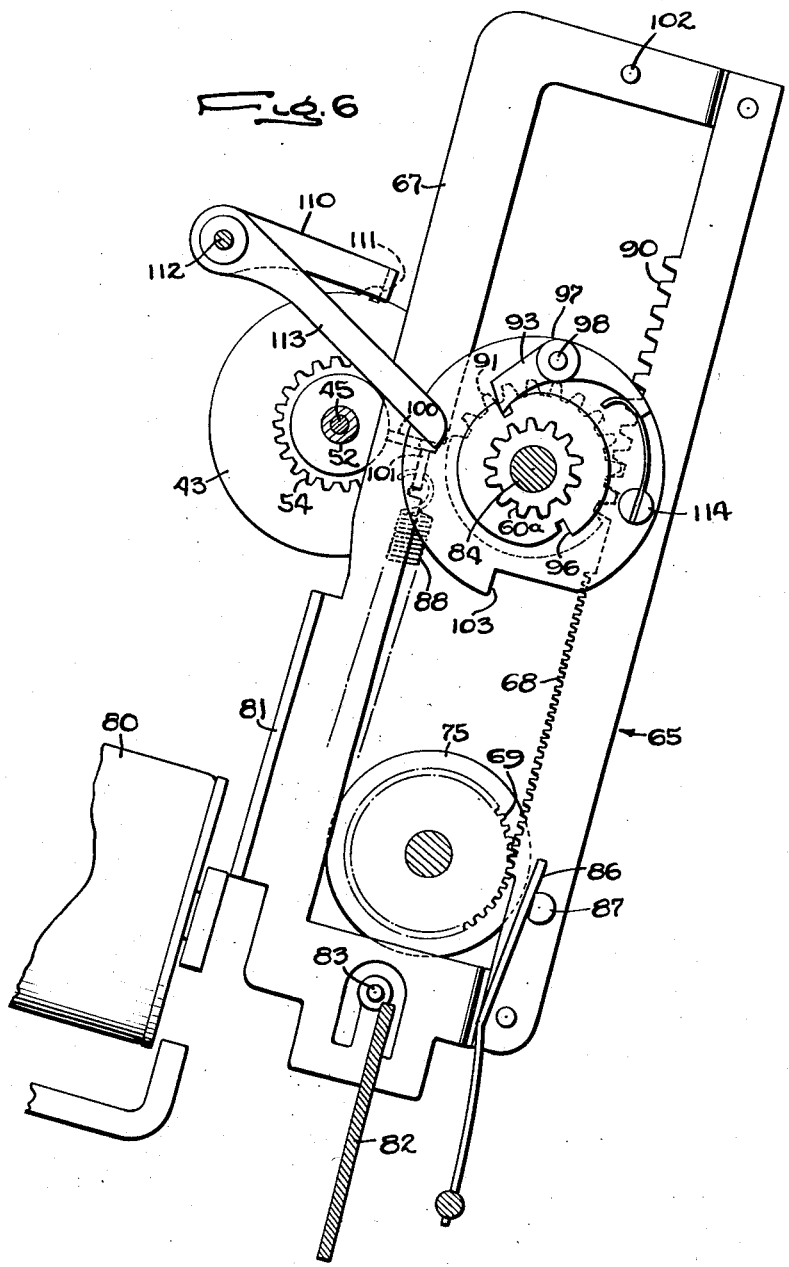

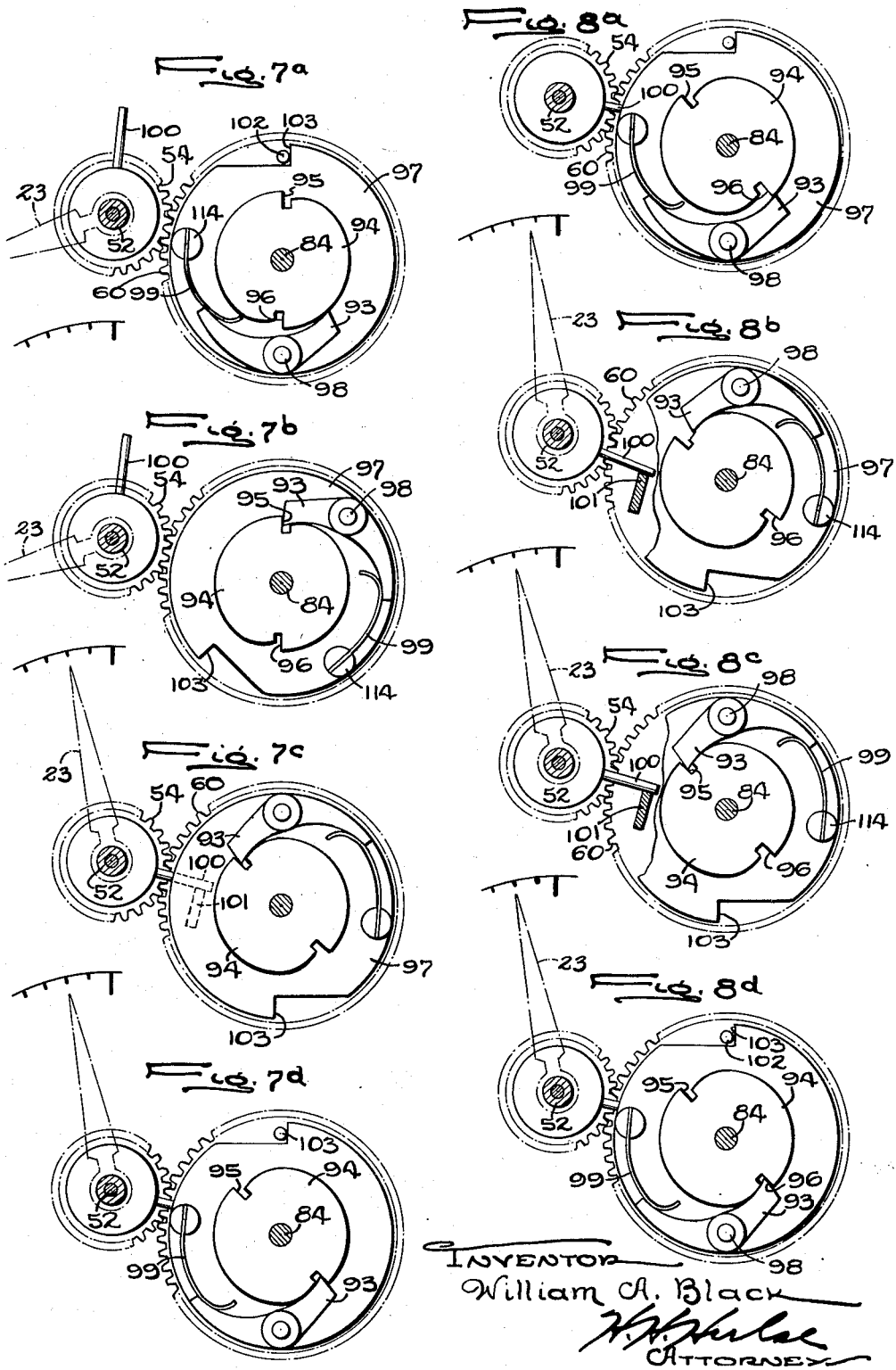

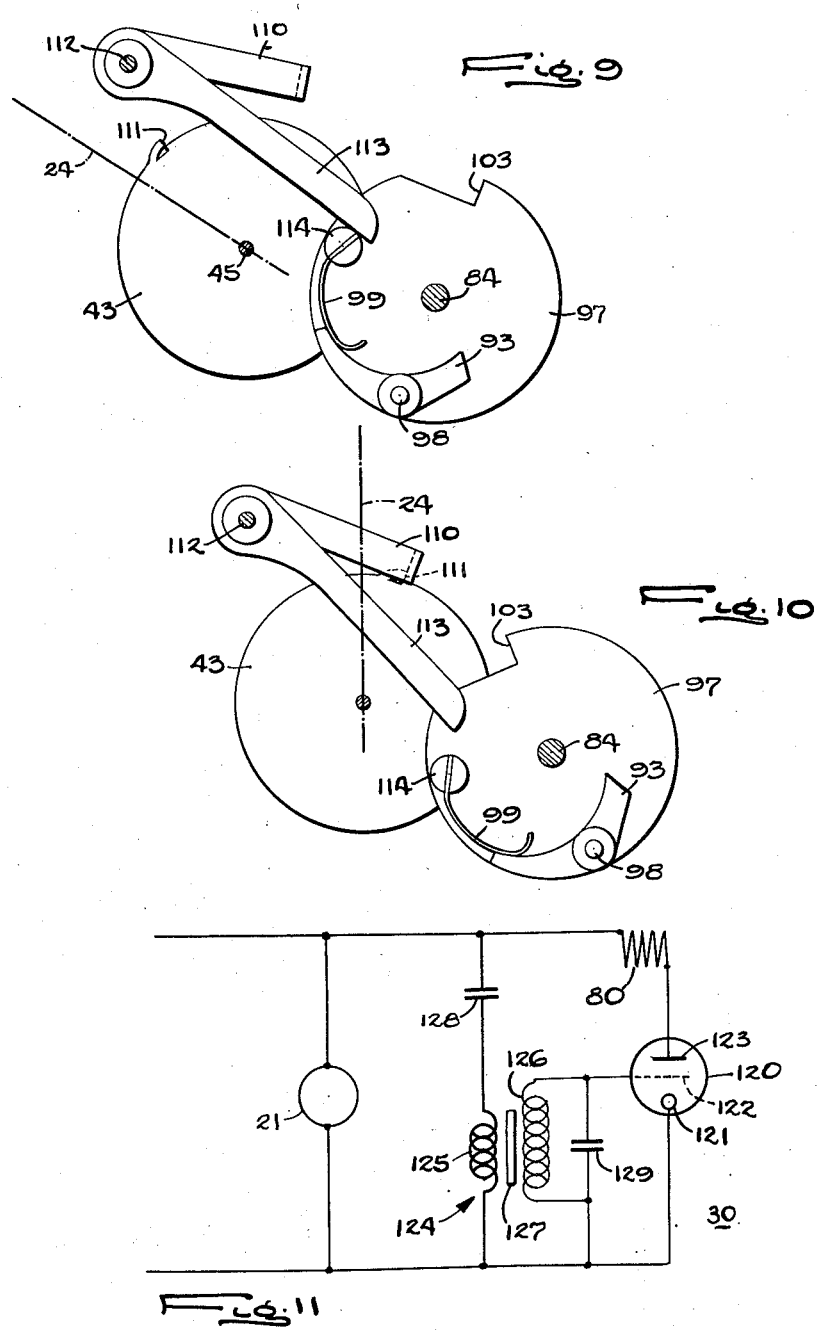

United States Patent Office 2,796,729
Patented June 25, 1957

2,796,729

SECONDARY CLOCK SETTING MECHANISM

William A. Black, Montclair, N. J., assignor to General Time Corporation, New York, N. Y., a corporation of Delaware Application December 24, 1953, Serial No. 400,287

10 Claims. (Cl. 58—34)

The present invention relates to clocks, and more particularly to secondary clocks and similar timekeeping units of the type normally driven by individual driving motors, for example, a synchronous A.-C. motor, and which are automatically corrected or reset at selected intervals in response to time signals transmitted from a source of correct time.

It is an object of the invention to provide a secondary clock having a degree of reliability which is greater than that of conventional clocks of the same general type. It is another object to provide a secondary clock in which response to correction signals is assured, and which will refuse to respond to extraneous disturbances caused, for example, by starting and stopping motors and other electrical apparatus. It is a related object to provide a resetting mechanism which is initiated by a high frequency timing signal superimposed upon the supply line and which is "locked in" after a predetermined time interval to insure that the resetting cycle, once set in motion, is completed. It is a more detailed object to provide a secondary clock which is non-responsive to transient or other line disturbances, but which is nevertheless capable of responding reliably to intentional resetting or correction signals of low amplitude. It is a further object to provide a clock which requires only a small amount of power to engage the resetting mechanism, but which develops large disengaging forces to insure disengagement at the end of the correction cycle, thereby overcoming the force of friction and residual magnetism.

It is another object to provide a resetting mechanism capable of correcting a clock which is running either fast or slow, but which places only a low power drain on the clock motor, thereby enabling the use of low power synchronous motors of the type employed in conventional electric clocks, while providing adequate margin of reserve power.

Finally, it is an object of the invention to provide a secondary clock which is simple and relatively inexpensive of construction, which is easily adjusted, and which maintains its adjustment over long periods of time, requiring substantially no care or maintenance.

Other objects and advantages of the invention will be apparent upon reading the attached description and upon reference to the drawings, in which:

Fig. 2 is a section taken along the line 2—2 in Fig. 1.

Fig. 2a is a section taken along the line 2a—2a in Fig. 1.

Fig. 3 is an exploded perspective of the mechanism simplified to facilitate understanding.

Fig. 4 is a fragmentary view in partial section of the swingable rack assembly under normal running conditions, with the clock assumed to be running 15 minutes slow.

Fig. 5 is a fragmentary view showing the rack locked in for execution of a correction cycle.

Fig. 6 is a view similar to Fig. 5 but showing the rack at the end of the correction cycle and just prior to disengagement.

Figs. 7a–7d are a series of stop-motion views showing the movement of the resetting cam and associated minute hand during a correction cycle, with the clock running 15 minutes slow.

Figs. 8a–8d are a series of stop-motion views similar to the above, but with the clock assumed to be running 50 seconds fast.

Fig. 9 is a fragmentary view showing the means for positioning the second hand during the correction cycle under normal running conditions.

Fig. 10 is a fragmentary view similar to Fig. 9, but showing the second hand stopped at the zero, or corrected, position.

Fig. 11 is a schematic diagram of the electrical control circuit.

Figure 1:
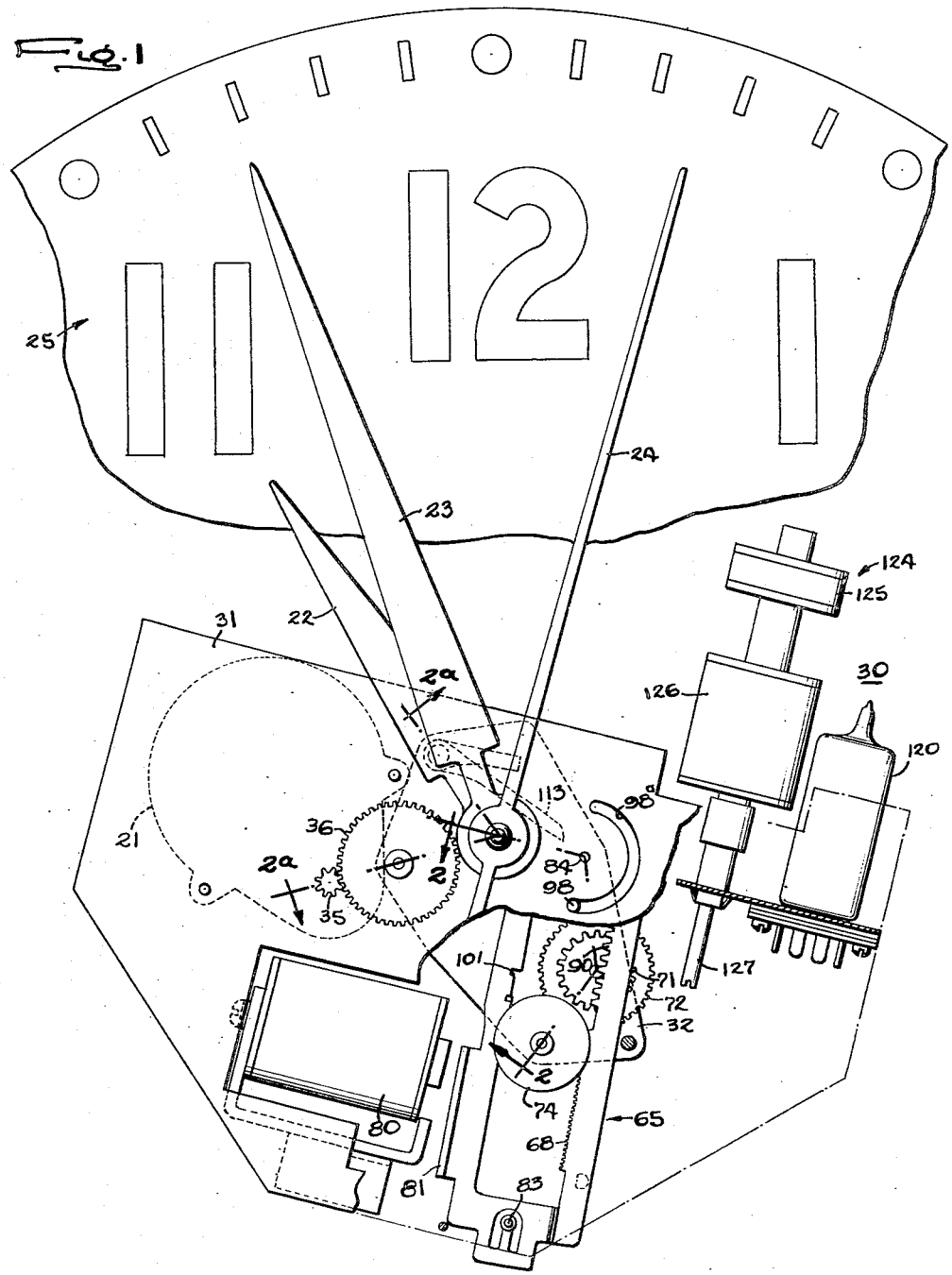
Figure 1 is a front view of the clock mechanism with portions, including the front mounting plate, broken away to show details of construction.

While the invention has been described herein in connection with a preferred embodiment, it will be understood that I do not intend to limit the invention to such embodiment, but intend, on the contrary, to cover all modifications and alternative constructions which may fall within the spirit and scope of the appended claims.

Turning now to the drawings, the clock mechanism indicated generally at 20 is driven by a synchronous motor 21. It has the usual hour, minutes and second hands 22, 23 and 24, respectively, cooperating with a face 25. The clock further includes a tuned receiving device 30 for responding to a resetting signal which is impressed upon the supply line at a predetermined instant during each successive hour by a transmitter (not shown). The component parts are mounted on a frame having a front plate 31 and a rear frame plate 32, the plates being held in rigid box-like formation by suitable posts or spacers 33.

Prior to discussing the resetting means, it will be helpful to understand the normal driving train which interconnects the synchronous motor 21 and the clock hands, particular reference being made to the perspective, Fig. 3. The motor 21 has a driving pinion 35 which may, for example, operate at a speed of 10 R. P. M. Rotary movement is transmitted through a pair of speed reduction gears 36, 37 to a second hand driving gear 38. Locked for rotation with the gear 38 is a drive disc 39, the disc and gear being coupled together in the present instance by means of axially extending tabs 40 on the disc which are received in registering holes 41 in the gear. Lying adjacent the drive disc 39 is a second hand disc 43, the two discs being frictionally engaged with one another by a bowed spring 44 interposed between them. The disc 43 is drivingly connected to a center shaft 45, which extends coaxially through the clock mechanism and which is connected at its front end to the second hand 24.

For the purpose of driving the minute hand, a compound reduction gear 50 is provided, which receives its power from a pinion 38a on the second hand gear 38. Coupled to the pinion 50a of the compound gear 50 is a minute hand driving gear 51. This gear is freely mounted at the end of a minute hand shaft 52 and is frictionally coupled to the shaft 52 by means of a bowed spring 53. The latter spring by reason of its friction rotates a minute hand pinion 54, which is fixed to the shaft 52. To restrain the driving gear 51 from moving axially under spring pressure, a flange or collar 55 is provided at the end of the shaft 52.

The means for driving the hour hand 22 is also set forth in Fig. 3, and includes a compound speed-reducing gear 60 having a pinion 60a which is engaged by an hour hand driving gear 61, the latter being connected directly to the hour hand 22. As a result of the foregoing, the hour, minute and second hands are all driven at an appropriate speed by the synchronous motor 21 which is fed from the A.-C. line, the operation of the arrangement being entirely conventional.

One of the difficulties with conventional clocks results from power failure in the A.-C. line. Such failures are usually quickly corrected and may last from a few seconds to the better part of an hour, or until the difficulty has been corrected and power re-established. As covered in the paragraphs which follow, the present secondary clock includes improved means for resetting the clock, i. e., bringing the hands into accordance with the correct time once each hour in response to a high frequency signal sent out over the same A.-C. line which supplies the driving motor. It will be assumed that a resetting signal is sent out 56 minutes and 55 seconds after the hour, and that such a resetting signal is applied for a period of 7 seconds. As will be discussed in greater detail, the resetting mechanism requires 1 minute and 5 seconds to complete its cycle of operation starting from the time that the resetting signal is initially applied. Based upon such time interval, the minute hand of the clock is positioned precisely at the 58 minute mark, while the second hand is positioned at the zero mark. Such positions are termed the reference positions. Upon completion of the correction cycle the normal clockwork mechanism takes over until the cycle is repeated one hour later, and so on throughout the day.

In accordance with the present invention, improved means are provided for positively clutching the driving motor to the minute hand for rapid advancement of the minute hand from a "slow" position to the reference, i. e., 58 minute, position which it occupies at the end of the correction cycle. In the present device, such clutching is accomplished by a pivoted rack which is magnetically brought into engagement with a motor-driven pinion at the beginning of the correction cycle. As shown in the drawings, the rack member, indicated at 65, is of hollow rectangular construction, having a longitudinal rack portion 66 and a longitudinal armature portion 67. The portion 66 of the rack member has a rack 68 arranged opposite a motor-driven rack pinion 69. The motor-driven rack pinion 69 is constantly driven from the gear 50 through gears 71, 72, 73.

In carrying out the present invention, the rack is mounted for endwise movement, as well as for bodily swinging about a stationarily mounted pivot. Normally, the rack is gravity-biased out of engagement with the motor-driven pinion 69, so that no longitudinal movement of the rack may occur. The spring 88 also provides a biasing moment to hold the rack out of engagement with pinion 69. However, at the beginning of a correction cycle, the rack member 65 is swung counterclockwise, thereby engaging the rack and pinion 68, 69. In order to guide the rack into contact with the pinion, the pinion is fitted with a pair of radially extending flanges or collars 74, 75, which keep the rack in an alined position. For the purpose of swinging the rack member 65, I prefer to use an electromagnet 80, which cooperates with an armature 81 mounted on the rack member 65.

In accordance with one of the aspects of the invention, means are provided for "locking in" the rack member, so that the rack member completes its correcting cycle once such cycle has been initiated by a sustained signal. This is accomplished in the present instance by a rail 82 mounted on the frame, which rail is engaged by a pin 83 at the lower end of the rack member. During normal driving of the clock, the rack member occupies a retracted position, with the rack and pinion connection disengaged, and with the rack member at the lowermost point of its range of movement (Fig. 4). Upon energizing the electromagnet 80, the rack is swung clockwise about a gear 91 with shaft 84 as the pivot center. Subsequent movement of the rack member 65 in a vertical direction causes the pin 83 to ride upwardly along the inside surface of the rail 82 which is the surface nearest the electromagnet. The beginning of such movement is shown in Fig. 5. When the pin 83 is opposite the inside surface of the rail 82 the rack member is held captive against the magnet 80, and the electromagnet may be de-energized without disengaging the rack and pinion drive connection. The clutch connection formed by the latter is thus locked in until the cycle is complete. The rack member 65 continues to be impelled upwardly by the drive pinion 69 until such time as the pin 83 clears the top end of the rail 82, which is the condition shown in Figs. 3 and 6, whereupon the rack member 65 is free to rotate out of engagement with the driving pinion, terminating the correction cycle.

In order to insure that the rack member 65 moves into its retracted position promptly when the correction cycle has been completed, a spring 85 is provided which is progressively tensioned during movement of the rack member. Such spring is mounted on the frame and has a tapered portion 86 engaged by a post 87 on the rack member. It will be apparent that while the spring 85 exerts little or no pressure when the magnet is energized, at the beginning of the correcting cycle, such spring exerts a progressively increasing force as the rack member is drawn upwardly. By the time that the rack member reaches its maximum upward position, the retracting force is appreciable and the rack member is therefore snapped quickly over the top end of the rail 82, to signal the end of the correction cycle. The rack then drops back to its retracted position under the force of gravity and because of the pull exerted by a return spring 88.

Further, in accordance with the present invention, means are provided for forcibly positioning the minute hand, as a result of vertical movement of the rack member 23, so that it occupies a predetermined reference point at the end of the correction cycle. To accomplish this, there is formed on the inside of the longitudinal rack portion 66 a rack 90 which drives a resetting gear 91 having an alining disc 92. The resetting gear which is utilized to pick up the minute hand when it runs slow, has teeth formed on only one-half of its periphery, since it is required to make only half a revolution during its operating cycle. Since the amount that the minute hand may be slow is indeterminate, a lost-motion takeup connection is interposed between the minute hand pinion 54 and the resetting gear 91. In the present instance such lost-motion connection is provided by a pawl 93 and cam 94, the pawl being operated by the resetting gear 91 and the cam being directly coupled to the minute hand pinion via the gear 60 referred to above. The gear 60 has a rotational speed which is one-half of that of the minute hand pinion 54; therefore a two-cycle cam is used having first and second abutments 95, 96 diametrically spaced from one another. For the purpose of carrying the pawl bodily about the periphery of the cam 94, a resetting disc 97 is provided, the resetting disc being directly coupled to the resetting gear 91. The disc 97 is dimensioned to extend beyond the confines of the resetting gear so that it cooperates with the disc 92 previously referred to in keeping the gear 91 and rack 90 alined with one another at all times. As shown in Fig. 6, the pawl 93 is mounted on the resetting disc 97 by a pivot 98. The pawl 93 is spring-biased into engagement with the cam by means of a spring 99. The disc 97 is limited in its movement by providing an arcuate slot 98a in the adjacent frame plate, the pivot 98 being arranged to bottom in one end thereof (Fig. 1).

The pawl and cam arrangement discussed above provides means for bringing the minute hand from some "slow" position up to the reference position during the course of correction cycle. In accordance with the present invention, means are further provided for positively defining the reference position and for moving the minute hand backwardly into such reference position when the minute hand is fast. In the present instance, this is accomplished by providing a radially extending abutment or pin 100 on the minute hand shaft which is engaged by a rack abutment or lug 101 so as to positively define the upper limit of movement of the rack member. The lug 101 also serves as a convenient means for anchoring the upper end of the return spring 88 to the rack member 65. The rail 82 previously referred to includes provision for longitudinal adjustment indicated at 82a, the adjustment being so made that the top end of the rail 82 is "cleared" at substantially the same time that the abutments 100, 101 come in contact with one another (Figs. 4–6) when the minute hand is at its reference position. This insures that the minute hand is positively positioned at the instant that the correction cycle is terminated. Since the mechanism thus far described is capable of moving the minute hand forwardly and backwardly depending upon whether it is slow or fast it may be referred to as a "centering" mechanism, the hand being centered on the desired reference point.

The mechanism described above may be more completely understood with reference to a typical operating cycle, it being assumed that the clock is running 15 minutes slow by reason of 15-minute interruption of power since last corrected. Just before the operating cycle begins, the parts occupy the condition shown in Fig. 4, the rack occupying a retracted position, with the driving pinion 69 disengaged. Upon being energized at 56 minutes, 55 seconds, after the hour, the rack member 65 is drawn into contact with the electromagnet 80, thereby engaging the rack teeth 68 with the driving pinion 69. The resetting signal is preferably applied for a period of 7 seconds. Five seconds after the resetting signal is first received, the rack is driven upwardly into the position shown in Fig. 5, so that the pin 83 is captive behind the rail 82. Using a 7-second resetting signal provides a 2-second margin, and therefore insures that the rack member is captive before the signal is ended. Subsequent rotation of the rack pinion 69 causes the rack to be moved longitudinally upward and causes progressive rotation of the resetting gear 91 and its associated pawl 93 as in Fig. 6.

In order to understand in greater detail the action of the resetting cam during a typical cycle, reference is made to the stop-motion views, Figs. 7a–7d, inclusive. The initial position of the cam 94 relative to the pawl which drives it is shown in Fig. 7a, the resetting disc being locked in its initial position by a pin 102 on the rack member which engages a notch 103 in the disc. When the rack member rises, the resetting disc is unlocked and rotated counterclockwise, the pawl riding around on the periphery of the cam until it reaches the cam abutment 95 as shown in Fig. 7b. Such movement takes place "idly" without corresponding movement of the cam, the gears 60, 54, or the minute hand 23. However, after the pawl strikes the abutment 95, continued movement causes the cam to rotate and causes progressive rotation of the gears 60, 54 and progressive movement of the minute hand into its reference position, the minute hand rotating at a speed 60 times as great as its normal speed of timed rotation.

As this correcting movement is continued, the radial abutment 100 on the minute hand shaft rotates downwardly and into engagement with the abutment 101 on the rack member which is rising to meet it. The position of the parts at the instant of impact is shown in Fig 7c (see also Fig. 3), where the rack has reached its limit of upward movement and where the minute hand occupies the reference position. At such instant the pin 83 on the rack member clears the rail 82, thereby allowing the rack to be snapped back by the spring 85. Thus released, the rack is free to drop endwise into its normal retracted position under the urging of the spring 88. As incident to the downward movement of the rack, the resetting gear 91 rotates the resetting disc 97, thereby restoring the pawl to its retracted position, as shown in Fig. 7d.

In the above example, it was assumed that the minute hand was 15 minutes slow. It will be apparent that the same operating sequence takes place when the minute hand is slow by a greater amount, up to a limiting condition of 59 minutes.

It is one of the further features of the present device that a fast minute hand may be moved backwardly to the reference position. A fast synchronous clock is unusual since in the great majority of instances error is due to power failure from one source or another. It is, nevertheless, possible that the generator which supplies power to the A.–C. lines may be running fast by a small amount, which may produce a cumulative error of up to 50 seconds or so in the course of an hour. The corrective procedure for a fast minute hand is shown in Figs. 8a–8d, inclusive, the amount of advancement of the minute hand being exaggerated in Figs. 8a, 8b, for purposes of emphasis. At the beginning of the correction cycle, the resetting cam and associated parts occupy the positions shown in Fig. 8a, the radial abutment 100 on the minute hand shaft being angled downwardly, as shown. After the correction cycle is initiated, the rack member will rise to a position shown in Fig. 8b, at which the abutment 101 engages the radial abutment 100. Further upward movement of the abutment 100 causes counterclockwise rotation of the gear 60, so that the parts occupy the position shown in Fig. 8c. This retracts the minute hand back to the reference, or 58-minute, position, and also rotates the resetting cam into a seated position against the driving pawl 93. Subsequent disengagement of the rack from the pinion 69 causes the rack to return to its normal lowered position, thereby returning the pawl 93 to the at rest position shown in Fig. 8d, in readiness for an ensuing correction cycle.

One skilled in the art will recognize that while the present device can correct a minute hand which is up to about 50 seconds fast, it cannot correct a minute hand which is fast by substantially more than this amount. The excessively fast condition has the effect of throwing the mechanism "out of time" so that it advances the minute hand by substantially a full hour during the subsequent correction cycle. The reason for this may be readily seen by reference to Fig. 8d. An excessively fast minute hand, say, fast by a minute or more, causes counterclockwise advancement of the cam 94, causing the pawl 93 to fall behind the cam abutment 96. Consequently, when the pawl 93 is rotated during the next correction cycle, it will carry the cam unwantedly through a full 180° of movement. In view of the fact that an A.–C. clock cannot run fast by more than a few cycles in the course of an hour, one skilled in the art will readily appreciate that the above operation does not constitute any practical disadvantage while enabling the mechanism to be greatly simplified.

In the preceding discussion, the means for setting the minute hand to a reference position have been discussed. Attention will now be given to the corresponding means for setting the second hand to its reference, or zero, position, on the clock face. To accomplish this, means are provided for locking the second hand at its zero position as incident to upward movement of the rack member. The zero position of the second hand is determined by a second hand stop lever 110, which engages a stop 111 formed on the periphery of the second hand disc 43. Normally, stop lever 110 occupies a raised position clear of the stop 111, the stop lever being supported on a shaft 112. For holding the shaft in the retracted position, an actuating lever 113 at the forward end of the shaft 112, the right-hand end of the actuating lever being supported by a stop or protuberance 114 on the face of the resetting disc 97. To understand the operation of the mechanism referred to, reference is made to Figs. 9 and 10. Fig. 9 shows the mechanism at the outset of a correction cycle and with the second hand 24 running approximately 5 seconds slow. As the rack begins to rise, it causes counterclockwise rotation of the resetting disc 97, thereby dropping the stop 114 mounted thereon. The resulting rotation of the actuating lever 113 causes the stop lever 110 to be dropped in the path of movement of the stop 111, which condition is shown in Fig. 10. Thus, the second hand is blocked at its reference position from the time that the stop 111 is engaged until the end of the correction cycle, with slippage taking place at the friction coupling associated therewith. At the end of the cycle the abutment 114 returns to the initial position shown in Fig. 9, thereby freeing the second hand for timed rotation. The fact that the correction cycle is a full minute in length insures that the second hand will reach the reference position.

Control circuit

The control circuit for causing operation of the electromagnet 80 is shown in Fig. 11. Here it will be noted that the electromagnet is arranged in the anode circuit of a cold cathode tube 120 having a cathode 121, a grid 122 and an anode 123, the tube being of the type capable of firing with a grid voltage of about 70 volts. The grid circuit includes a tuned step-up transformer 124 having a primary 125 and a secondary 126, and a tunable core 127. The primary winding 125 is placed in series with a capacitor 128 across the A.-C. line. A capacitor is also provided in the secondary circuit, the capacitor 129 being connected in shunt with the secondary coil.

While the operation of the circuit will be apparent to one skilled in the art, it may be helpful to summarize it briefly. The primary circuit 125, 128 is tuned by proper choice of capacitor 128 so that it is series-resonant at the frequency of the correction signal. Such signal may, for example, have a frequency of 4700 cycles per second and may be generated by a suitable transmitter either capacitively or inductively coupled to the A.-C. supply line. The condition of resonance sets up a substantial flow of current through the primary circuit at the frequency of the correction signal, thereby inducing a voltage across the secondary of the transformer. Since the secondary of the transformer preferably includes a larger number of turns than the primary and since it, too, is resonant, a substantial voltage is built up between the grid and cathode of the tube 120. This voltage may, for example, be on the order of 100 to 150 volts with a signal level of only one volt existing in the A.-C. line. Since a grid voltage of about 70 volts is sufficient to fire the tube, an adequate margin of safety is provided. Firing of the tube causes a substantial flow of current from cathode to anode, thereby energizing the electromagnet 80, the electromagnet remaining in the "picked up" condition until the correction signal is terminated 7 seconds later.

The arrangement described above is distinguished primarily by its reliability as compared to more conventional secondary clocks. Since the electromagnet 80 must be energized constantly for a full 5 seconds in order for the tube to be "locked in," any signal less than 5 seconds long is ineffective. Also totally ineffective are signals at a different frequency from that to which the control circuit has been tuned. Thus, as a practical matter, the correction cycle can only be initiated by an intentional control signal, and there is no problem of malfunctioning caused by disturbances on the supply line transient and otherwise, incident to operation of motors, vibrators or the like. The signal level of the intentional control signal may, however, be varied over rather wide limits without affecting the operation of the device, signal levels of ¾ to 4 volts being entirely adequate. This enables clocks to be controlled which are located at the extremes of the electrical system in a large factory, school system, or the like.

The tuned circuit 30 may be of extremely light construction, since a limited amount of current suffices to operate the electromagnet 80. It is to be noted that such current need not perform any work except that required to swing the armature through a small angle. All of the work required for moving the hands to the correct position is accomplished by the motor 21 which drives the clock under normal conditions. But again, the torque demand is low, since even under extreme conditions all the clock motor must do is to rotate the clock hands against the resisting torque of the friction couplings, together with the small amount of friction which may exist in the gears. The mechanical advantages are favorable, and peak loads are avoided so that the clock motors of conventional type are adequate to drive the above mechanism with a satisfactory safety margin. Nor is the return friction of the rack a troublesome factor since the rack is positively disengaged at the end of the correction cycle by the force which has been progressively built up in the spring 85. Since there is no tendency for the device to get out of adjustment and since the cold cathode tube and associated parts have inherently long life, the reseting mechanism need be given no more care than a conventional A.-C. clock of the non-reset type.

While the invention has been described above in connection with a resettable clock of the A.-C. type, it will be understood that the driving motor 21 may, if desired, be replaced by a D.-C. stepping mechanism.

In the following claims the term "clock hand" or "minute hand" is intended to cover an indicating element in a timing device which is rotated or otherwise timingly advanced upon passage of time similar to a clock hand and which is susceptible of periodic correction. The term "synchronous motor" includes any motor which rotates in step with a train of electrical impulses as a substantially constant speed motor.

What I claim is:

1. In a secondary clock having a cyclically movable clock hand coupled to a synchronous motor for time indication and adapted to be connected to a source of periodically repeated electrical signals of predetermined duration, a resetting mechanism comprising positioning means arranged for movement in a resetting direction between a retracted position and a limit position, normally disengaged clutch means between said positioning means and said motor for effecting said movement in a predetermined time interval longer than the signal duration when the clutch is engaged, actuating means coupled to said source energized by each signal for the duration thereof to engage the clutch and initiate said resetting movement, said positioning means including a clock hand coupling for picking up said hand during said resetting movement and moving the hand to a reference position corresponding to said limit position, means for retaining said clutch in engaged position in response to predetermined initial movement of said positioning means in the resetting direction and for releasing the clutch when the positioning means reaches said limit position, and a spring for returning said positioning means to its retracted position (a) upon reaching the limit position and (b) in the event of interruption of said signal before completion of said predetermined initial movement of said positioning means to prevent resetting of said clock hand in response to a signal of less than said predetermined signal duration.

2. In a secondary clock having a synchronous motor and a rotating minute hand coupled to the motor through a gear train, a mechanism for resetting the minute hand to a desired reference position corresponding to the incidence in chronological time of an electrical control signal which comprises positioning means susceptible to a predetermined displacement from a retracted position to a limit position corresponding to said desired hand reference position for picking up said minute hand during said displacement and positively advancing the minute hand to said reference position, normally disengaged clutch means for coupling the positioning member to said motor to effect said displacement in a predetermined time when the clutch is engaged, means for adjusting the displacement limit position of said positioning means to thereby predetermine the displacement time thereof, means actuated by said control signal to engage the clutch for the duration of the signal, means for retaining the clutch in engaged position in response to predetermined initial displacement of said positioning means in a resetting direction and for releasing the clutch when the positioning means reaches said limit position, and means for returning said positioning means to its retracted position in the event the signal is interrupted before the clutch is retained in engaged position.

3. In a secondary clock having a synchronous motor and a clock hand coupled by a gear train to the motor, a resetting mechanism for positioning said hand to a reference time indicating position corresponding to the initiation of an electrical time signal of minimum predetermined duration which comprises a positioning member mounted for a predetermined movement between a retracted position and a limit position, means actuated by the signal for clutching said positioning member to the motor, means for retaining said clutching means in engaged position for effecting progressive movement of the positioning member over a predetermined time greater than said minimum predetermined signal duration to its limit position, means for thereafter returning the positioning member to the retracted position to complete an operating cycle, said last named means being effective to interrupt the operating cycle and return the positioning member to its retracted position in the event the signal is terminated short of said minimum predetermined duration, and means operated by said positioning member for centering the hand at a reference position corresponding to said limit position during the course of said operating cycle.

4. In a secondary clock having a synchronous motor and a clock hand coupled by a gear train to the motor, a resetting mechanism for positioning said hand to a reference time indicating position corresponding to the initiation of an electrical time signal of minimum predetermined duration which comprises a positioning member biased into a retracted position and mounted for a predetermined range of movement to a limit position, means actuated by the signal for clutching said positioning member to the motor, means for retaining said clutching means in engaged position for effecting movement of the positioning member for a predetermined time greater than said minimum predetermined signal duration to the limit position against the bias force, said last named means being ineffective in the event the signal is terminated short of said minimum predetermined signal duration, and means for unclutching the motor upon reaching such limit position to release the positioning member for return to its retracted position, means operated by said positioning member as it approaches the limit position for centering the hand at a reference position.

5. In a secondary clock adapted to be connected to a source of chronological time spaced electrical resetting signals of uniform duration, the combination comprising a synchronous motor, means including a minute hand and second hand each having a step-down drive connection as well as a friction coupling for normal coupling to the motor, minute hand positioning means including a positioning member arranged for a predetermined movement between a retracted position and a limit position, means including a normally disengaged positive clutch for coupling said positioning member to said motor, means for locking said clutch means in engaged condition until said positioning member has attained the limit position, actuating means energizable by each resetting signal to initiate engagement of the clutch, said actuating means being ineffective in the event the signal is terminated short of said signal duration, means on said positioning member for advancing the minute hand during said movement and positioning it at a reference position corresponding to the limit position of said member when the hand lags said reference position, means for positively blocking the second hand at a reference position by each resetting signal, and means for releasing said positive clutch and for unblocking said second hand upon completion of movement of said positioning member to said limit position.

6. In a secondary clock having a synchronous motor and a clock hand coupled to the motor for time indication, an overriding resetting mechanism for resetting said hand periodically in response to periodic chronological time electrical control signals which comprises a positive centering mechanism susceptible to movement in a resetting direction to a limit position for moving said hand to a reset position corresponding to said limit position, a normally disengaged clutch means for driving said centering mechanism to said limit position in a given predetermined time by said motor when said clutch is engaged, means connected to a source of said control signals for engaging said clutch for the duration of a control signal, and means for retaining said clutch in engaged position in response to predetermined initial movement of the centering mechanism in the resetting direction and for releasing the clutch when said centering mechanism reaches said limit position.

7. In a secondary clock adapted to be connected to a source of chronological time electrical resetting reference signals less than a given time duration, the combination comprising a synchronous motor, a clock hand coupled by a set of gears to said motor, a rack member arranged for progressive movement in said given time duration from a retracted position to a limit position, a rack pinion drivingly connected to said motor, means responsive to a resetting signal for initiating engagement of said rack and said rack pinion, means for retaining said rack and rack pinion in engagement for the remainder of said given time duration until the rack member reaches its limit position, positioning means driven by said rack member for picking up said hand and advancing it to a predetermined reference position corresponding to said limit position of said rack when the hand lags said reference position, and means for returning the rack member to its retracted position in readiness for a succeeding resetting cycle.

8. In a secondary clock adapted to be connected to a source of electrical resetting signals initiated at selected chronological reference times, and having a minute hand coupled by a gear train to a constant speed motor for time indication, a resetting mechanism comprising positioning means movable in a resetting direction to a limit position, a normally disengaged clutch between said positioning means and said motor for moving said positioning means to said limit position in a predetermined time when the clutch is engaged, means actuated by a resetting signal for initiating engagement of said clutch, said positioning means having a minute hand coupling for advancing the hand to a reference position corresponding to said limit position, a spring for biasing the clutch for disengagement, means for progressively tensioning the spring incident to movement of the positioning means toward its limit position, and means for retaining said clutch in engaged position in response to predetermined initial movement of said positioning member in the resetting direction and for releasing it for disengagement by said spring when said positioning means reaches its limit position.

9. A resetting mechanism for resetting the time hand of a secondary clock in response to a chronological time electric control signal including a pivoted rack member mounted for endwise movement in a resetting direction between a retracted position and a predetermined limit position, pick-up means on said rack member for engaging the hand in the course of the resetting movement and advancing the same to a reference position corresponding to the rack limit position, a rack pinion coupled to a constant speed motor, means actuated by a control signal for moving the rack member laterally from the retracted position into engagement with the rack pinion for the duration of the signal, means for holding said rack member in engagement with the pinion in response to predetermined initial endwise movement of said rack member in the resetting direction and for releasing the rack from engagement with the pinion when the rack member reaches its limit position, and biasing means for returning the rack member to its retracted position upon release of the rack from said pinion.

10. In a secondary clock adapted to be connected to a source of resetting electrical signals initiated at selected chronological time periods, the combination comprising a synchronous motor, means including a minute hand coupled by a gear train to said motor for time indication, positioning means mounted for a preselected displacement between a retracted position and a limit position, clutch means for coupling said positioning means to the motor for effecting said movement in a given time greater than the duration of said chronological time periods, said clutch having biasing means for normal disengagement, an electromagnet responsive to a setting signal for initiating clutch engagement, means for retaining said clutch means in engaged condition until said positioning means reaches the limit position, and means actuated upon said positioning means reaching its limit position for returning the same to its retracted position thereby completing an operating cycle, said positioning means including a minute hand operator for centering the hand at a reset position.

References Cited in the file of this patent

UNITED STATES PATENTS

| | | |
|---|---|---|
| 1,968,932 | Eberhardt et al. | Aug. 7, 1934 |
| 2,145,018 | Tweedale | Jan. 24, 1939 |